(12) United States Patent
Bertolini (10) Patent No.: US 10,119,790 B2
(45) Date of Patent: Nov. 6, 2018

(54) BULLET- AND BLAST-RESISTANT WINDOW AND ASSOCIATED APPARATUS

(71) Applicant: ISOCLIMA S.P.A., Este (IT)

(72) Inventor: Alberto Bertolini, Este (IT)

(73) Assignee: ISOCLIMA S.P.A., Este (IT)

( * ) Notice: Subject to any disclaimer, the term of this patent is extended or adjusted under 35 U.S.C. 154(b) by 0 days.

(21) Appl. No.: 15/315,276

(22) PCT Filed: Aug. 6, 2015

(86) PCT No.: PCT/EP2015/001630
§ 371 (c)(1),
(2) Date: Nov. 30, 2016

(87) PCT Pub. No.: WO2016/026554
PCT Pub. Date: Feb. 25, 2016

(65) Prior Publication Data
US 2017/0234656 A1  Aug. 17, 2017

(30) Foreign Application Priority Data

Aug. 20, 2014 (EP) .................................. 14425108

(51) Int. Cl.
*F41H 5/04* (2006.01)
*F41H 5/26* (2006.01)
*B60J 1/20* (2006.01)

(52) U.S. Cl.
CPC .......... *F41H 5/0407* (2013.01); *B60J 1/2094* (2013.01); *F41H 5/263* (2013.01)

(58) Field of Classification Search
CPC ........ F41H 5/0407; F41H 5/263; B60J 1/2094
See application file for complete search history.

(56) References Cited

U.S. PATENT DOCUMENTS

2011/0185884 A1   8/2011   Krueger et al.

FOREIGN PATENT DOCUMENTS

| DE | 19601982 C1 | 12/1996 | |
| DE | 10300397 B3 * | 6/2004 | ....... B32B 17/10045 |
| DE | 10300397 B3 | 6/2004 | |
| DE | 10340907 A1 | 4/2005 | |
| DE | 102008028318 A1 | 12/2009 | |
| EP | 0890467 A1 | 1/1999 | |
| WO | 0153769 A1 | 7/2001 | |

OTHER PUBLICATIONS

International Search Report dated Nov. 3, 2015 in International Application No. PCT/EP2015/001630.
Written Opinion dated Nov. 3, 2015 in International Application No. PCT/EP2015/001630.

* cited by examiner

*Primary Examiner* — D Glenn Dayoan
*Assistant Examiner* — Melissa A Black
(74) *Attorney, Agent, or Firm* — Hauptman Ham, LLP (57) ABSTRACT

The present invention refers to a bullet- and blast-resistant window, in particular for use in a motor vehicle, which comprises a ballistic block having a peripheral face and a plurality of panes of glass, ceramic or plastic material bonded to each other over their surfaces in a layered composite, and interposed bonding interlayers of plastic material or adhesive, wherein an edge groove having slopes at least partly inclined for engagement with a part of the vehicle body and extending on and along at least a part of the peripheral edge of the window.

20 Claims, 5 Drawing Sheets

BULLET- AND BLAST-RESISTANT WINDOW AND ASSOCIATED APPARATUS

RELATED APPLICATIONS

The present application is a National Phase of International Application Number PCT/EP2015/001630, filed Aug. 6, 2015, and claims priority to European Application Number 14425108.9, filed Aug. 20, 2014.

The present invention relates to a bullet- and blast-resistant window and to an associated bullet- and blast-resistant apparatus according to the preambles of claim 1 and claim 13, respectively, in particular for use in a motor vehicle or car.

EP 0890467 B1 describes a door frame of a protected vehicle in which a laminated bullet-proof glass pane or window is arranged that has five layers of bullet-proof glass. The outside glass layer has a protrusion for fixing the whole glass pane in the door frame. The door frame comprises a frame strengthening profiled element with a protrusion engaging in a recess with rectangular cross section on the peripheral face of the bullet-proof glass pane. In the case of a strong blast or explosion, the protrusion of the outside layer can break and the bulletproof glass pane could fall into the interior of the vehicle due to forced deformation and shifting of the profiled element in a peripheral direction away from the bullet proof glass pane which could become dangerous for the passengers in the vehicle.

It is thus an object of the present invention to provide a bullet- and blast-resistant window and an associated bullet- and blast-resistant apparatus which protects the interior of a vehicle against the effects of a strong blast or explosion from outside of the vehicle.

This object is achieved by the bullet- and blast-resistant window mentioned in claim 1. Accordingly, the bullet- and blast-resistant window of the present invention which is preferably used in a motor vehicle, e.g. as a windscreen in a car, a ship or an aircraft, comprises a ballistic block having a peripheral face and a plurality of bullet-proof or bullet-resistant panes of glass, ceramic or plastic material bonded to each other over their surfaces in a layered composite or laminate, and interposed bonding interlayers of plastic material, and a groove having lateral slopes or side walls that are at least partly oblique to an inside or outside surface of the window, for engagement with a part of the vehicle body and extending on and along at least a part of the peripheral edge of the window or glazing. The window of the present invention provides the considerable advantage that the affecting pressure of the blast is distributed onto a quite large surface of the oblique side walls of the peripheral groove which leads to a corresponding great resistance against deformation or shifting of the vehicle frame or the breaking of the window glass itself at its peripheral edge, resulting in an improved protection of the interior of the vehicle.

Preferably, the groove has oblique side walls or it has a V-shape which does not only avoid that the bullet resistant window can fall into the interior of the vehicle, but which also can avoid that the window will fall out from the vehicle to its outside, the reverse direction, due to a negative pressure on outside of the vehicle as result of the blast wave.

The groove or V-shaped groove can have oblique lateral walls or slopes with same or different inclination to allow specific applications adapted to the required space dimensions of the body of the car. Generally, the inclination or angle α of the V-shaped groove is dependent on a thickness of the ballistic block or window. Further, the V-shaped groove can be symmetrical or asymmetrical and it can have different shapes of its slopes.

In a preferred embodiment of the invention, the bullet- and blast-resistant window shows an additional outer transparent pane or layer made of bullet-proof glass, ceramic or plastic material, e.g. polycarbonate, which is bonded to or glued on an outside surface of the ballistic block by an interposing layer made of plastic material. The additional outer glass pane can protrude over the peripheral face of the ballistic block on the peripheral edge of the bullet- and blast-resistant window to form a protrusion of the outer glass pane which is used to fix the window on the body of the vehicle, for instance, in a door frame or rabbet of the vehicle chassis.

Preferably, the window or glazing of the invention comprises a layer or insert made of bullet-resistant material and bonded on the side walls or at least on an inner side wall or oblique slope of the groove or block groove. The insert helps to stop a bullet shot from outside onto the edge of the window in the area of the groove. Further, also bullets are stopped from entering inside of the vehicle by means of the insert or steel layer within the block groove on the peripheral face of the ballistic block which are on a line oblique to the surface of the window and impact such to cross the V-shaped groove. Accordingly, the ballistic insert ensures protection of passengers within the vehicle. A thickness of the ballistic insert or steel can be designed depending on the level of protection intended. Preferably, the thickness of the oblique ballistic insert is in a range from 2 mm to 10 mm.

The peripheral and circumferential groove or V-shaped groove can have an outer oblique side wall or slope directed to an outside of the window and an inner oblique side wall or slope directed to an inside of the vehicle, and the bullet resistant layer or insert can cover a part of the inner side wall or the whole inner oblique side wall of the V-shaped groove. The bullet-resistant layer can be a strip or frame made of ballistic steel to obtain a high resistance against bullets fired from outside.

The blast- and bullet-resistant window of the invention may have an inside surface recess that is provided on an inside surface of the ballistic block which adjoins the groove on the peripheral face of the ballistic block, and that a bullet resistant part extends from the peripheral face of the ballistic block in the inside surface recess. The additional bullet resistant part reinforces the edge of the window against bullets and blast effects and, additionally, it helps to protect the inside of the vehicle or passenger compartment from splinters originating from the edge of the window to enter inside of the vehicle in case of firing or explosion from outside of the car.

Preferably, the inside surface of the ballistic block or window and the inside surface of the bullet-resistant part are flush to provide a compact structure of the window of the invention. The bullet-resistant oblique insert and vertical part are connected to each other or are integral to provide high mechanical load capacity. Preferably, the bullet-resistant part arranged in the recess covers and/or overlaps the block groove laterally to ensure protection against bullets. A lateral overlapping distance Δ of the bullet-resistant part or steel should be always positive to ensure protection.

The bullet- and blast-resistant window of the present invention can be formed as a composite security glass pane, e.g. as a windshield, fixed to the vehicle, or as a moveable, retractable or extendable side window of a vehicle.

The bullet resistant oblique insert or strip and/or the bullet resistant vertical part or portion can be of any bullet-resistant material, for example a plastic material, such as polycarbonate, a ceramic material, such as aluminum oxynitride (AlON), a woven material, such as a carbon-fiber mat, or preferably of a metal, in particular ballistic steel.

The bullet-resistant oblique insert, the vertical part and/or the integral part or insert comprising the oblique insert and the vertical part can be a complete or partial frame, such as a framing strip on three sides or an edge reinforcement of steel, which will only be provided on a portion of the circumference of the blast- and bullet-proof window. The oblique insert, the vertical part and/or the integral edge insert can be assembled of individual parts, arranged in series on the circumference of the bullet-proof window or glazing, or on the peripheral face of the ballistic block, in order to form the complete oblique insert, the vertical part and/or the integral insert.

The ballistic block of the window can be adjacent or bonded to an additional outer pane of the window which provides a protrusion on the edge of the window. If, however, there is no outer glass pane with a protrusion, then the bullet- and blast-resistant window only comprise the ballistic block with the oblique insert arranged in the oblique groove.

The bullet-resistant strip or strips like the oblique insert and the vertical part are preferably bonded to the ballistic block, e.g. by means of a polyurethane or polyvinyl butyral (PVB) layer or another thermoplastic material, foil or adhesive material in order to ensure a composite structure with the ballistic block of long durability.

The bullet- and blast-resistant window of the present invention can be formed as a composite security glass pane, e.g. as a windshield, fixed to the vehicle, or as a fixed, moveable, retractable or extendable side or back window of a vehicle.

The invention also refers to a bullet and blast resistant apparatus according to claim 13 to be used in particular in an automotive vehicle, which comprises a bullet- and blast-resistant window as mentioned above or according to any one of claims 1 to 12, and a bullet- and blast-resistant armoring device, element or part provided to be engaged with the groove on the peripheral edge of the bullet-resistant window or ballistic block and being part of the vehicle body. The armoring device, therefore, is not a part or portion of the bullet- and blast-resistant window or glazing, but it is a part or portion of the body or chassis of the vehicle. For instance, the armoring device can be a part or portion of a door or door frame of the vehicle or of a window rabbet of the body of the vehicle. The armoring device can also be a separate part that is fixed on the body of the vehicle by, for instance, screws or welding.

The bullet- and blast-resistant apparatus provides an effective resistance against deformation or shifting of the vehicle frame or the breaking of the window glass itself at its peripheral edge, resulting in an improved protection of the interior of the vehicle, due to the engaging cooperation of the armored device of the vehicle body and the groove with oblique side surfaces on the edge of the window wherein the armoring device engages the circumferential groove if the window is installed on the vehicle.

Preferably, the armoring device of the vehicle body covers the whole edge face of the window or ballistic block or the exposed portions of its peripheral face and/or the bullet resistant oblique insert and, if provided, also the bullet resistant vertical part of the bullet resistant window to keep the position of the window even in case of a strong blast or explosion force in a direction from outside to inside of the vehicle, and also in the case of a low pressure on outside of the vehicle resulting in a pressure force directed from inside to outside of the vehicle.

Preferably, the bullet resistant armoring device fits positively into the groove of the window or ballistic block to keep the window in the door frame during blast and to distribute the pressure during blast on a large surface in an even manner. Further, the bullet-resistant armoring device can be formed to fit positively into the groove of the ballistic block to ensure the intended bullet-proof characteristics of the window together with a compact and space saving structure.

The armoring device can be arranged laterally flush on the peripheral edge of the ballistic block, thereby providing a space-saving and compact structure of the blast- and bullet-resistant apparatus of the invention when the armoring device engages the edge groove of window.

Further advantageous elaborations of the present invention can be seen from the dependent claims. Further advantages, advantageous elaborations and usages of the invention can be seen from the following description of exemplary and preferred embodiments of the invention with reference to the accompanying drawings, wherein:

Figure 1:
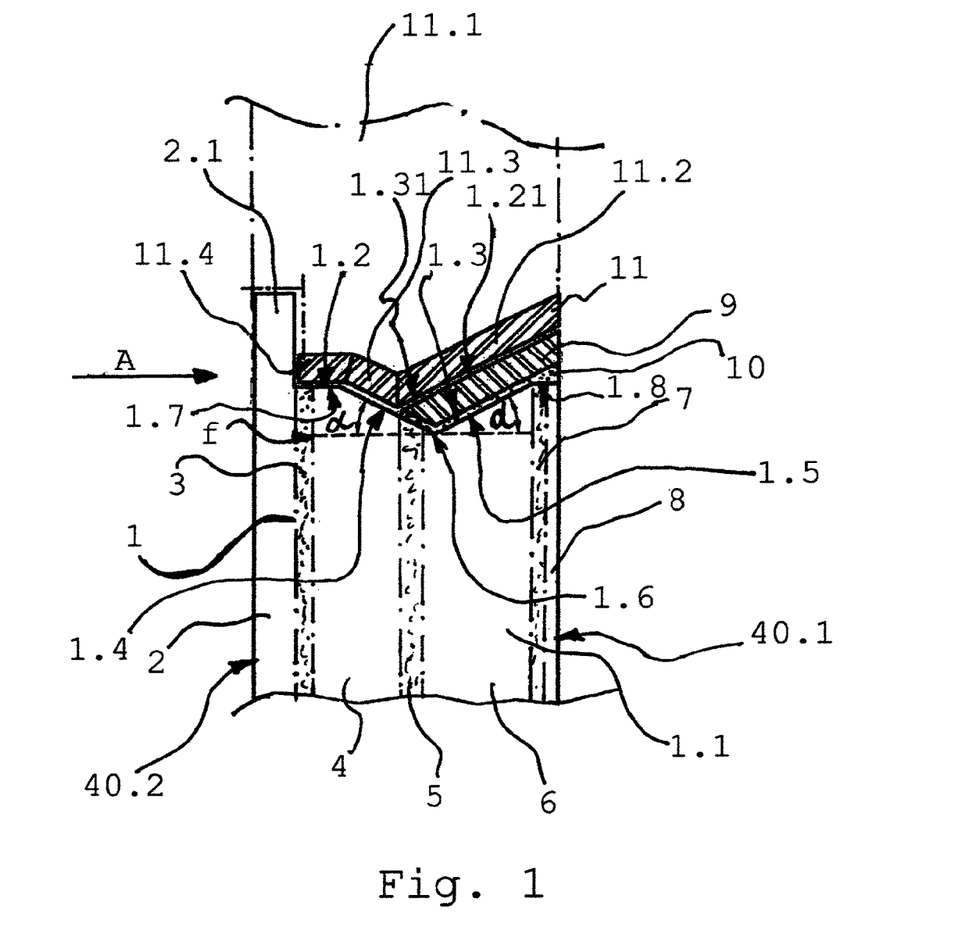
FIG. 1 is a schematic and partial cross-sectional view of a peripheral edge of a bullet- and blast-resistant window according to a first preferred embodiment of the invention with an associated apparatus of the invention.

FIG. 1 shows a partial view in cross-section of a preferred first embodiment of a bullet- and blast-resistant apparatus according to a preferred embodiment of the invention which comprises a bullet- and blast-resistant window 1 according to a preferred embodiment of the invention as a composite security glazing together with a bullet- and blast-resistant armoring device 11 that is a part of a vehicle body 11.1 of, for instance, an automotive vehicle. The following is a detailed explanation of the embodiment of the invention shown in FIG. 1 with exemplary reference to the usage of the bullet-proof window 1 according to the present invention as a windscreen of the automotive vehicle.

The transparent bullet- and blast-resistant window 1 of FIG. 1 has a transparent ballistic block 1.1 and at least one outer transparent glass pane 2 made of bullet-prove glass and arranged on the outside of the vehicle, i.e. on the side of impact of, for instance, a bullet or the pressure wave of an explosion, and a bullet-resistant insert 9. The outside and thus the impact side of the vehicle, is indicated by arrow A in FIG. 1, which faces toward the outer glass pane 2. The outer glass pane 2 has a protrusion 2.1 for fixing the window 1 in a door frame or rabbet of the vehicle body 11.1.

The ballistic block 1.1 comprises two sandwiched or laminated glass panes 4 and 6, a polycarbonate (PC) pane 8 that is arranged on the inside of the vehicle, and bonding interlayers 3, 5, and 7 of plastic material, e.g. of polyurethane (PU) or polyvinyl butyral (PVB) foil, which provide a composite or laminate between the outer glass pane 1 and the PC pane 8. The outer glass pane 2 has a portion that is a protrusion at the peripheral edge of the window 1 which protrudes over a peripheral face 1.2 of the ballistic block 1.1 at the peripheral edge of the window 1. The block groove 1.3 occupies the major part of the peripheral face 1.2 of the ballistic block 1.1. The block groove 1.3 can be manufactured by using a CNC (computerized numerical control) machine with 5 axis control and with a diamond tool having the shape or profile of the block groove 1.3.

The peripheral face 1.2 of the ballistic block 1.1 provides the block groove 1.3 in the shape of a V with an inclined outer slope 1.4 or side directed obliquely to an outside surface 40.2 of the window 1 and an inclined inner slope 1.5 or side directed obliquely to an inside surface 40.1 of the window 1 wherein the outer and inner slopes 1.4 and 1.5 cross in a vertex 1.6 or vertex line forming a bottom of the block groove 1.3 that is symmetrical. Further, the peripheral face 1.2 of the ballistic block 1.1 shows a flat shoulder 1.7 between the outer glass pane 2 and the inclined outer slope 1.4 of the V-shaped block groove 1.3, and a further flat shoulder 1.8 between the inner slope 1.5 of the block groove 1.3 and the inside of the window 1. The flat shoulders 1.7 and 1.8 are in the same plane being normal to an inside surface 40.1 and outside surface 40.2 of the window 1 wherein the vertex 1.6 or bottom of the block groove 1.3 extends beneath this plane. An slope angle α or inclination of the outer slope 1.4 with respect to a further plane f being normal to inside and outside surfaces 40.1 and 40.2 of the window 1 is equal to a corresponding slope angle α of the inner slope 1.5 with respect to the further plane f. As shown in FIG. 1, each of the slope angles α can be 30°. The block groove 1.3 is formed along the whole or a part of peripheral circumference or edge of window 1.

The ballistic insert 9 of the ballistic block 1.1 is shaped as a flat stripe or frame along the peripheral edge of the window 1 and it is arranged substantially on the inner slope 1.5 by means of an adhesive or a plastic material like, for instance, a PU foil 10. Accordingly, the ballistic insert 9 is arranged obliquely to the inside and outside surfaces 40.1, 40.2 of window 1. The ballistic insert 9 is made of ballistic steel. Side faces of the ballistic insert 9 adjoin the outer slope 1.4 and are flush to the inside surface 40.1 of window 1. Further, the ballistic insert 9 covers the whole inner slope 1.5, the flat shoulder 1.8 of the peripheral face of the ballistic block 1.1, the vertex 1.6, and a part of the outer slope 1.4 adjoining the vertex 1.6 or bottom of the block groove 1.3.

The exposed surfaces of the ballistic insert 9, the exposed part of the outer slope 1.4, and the flat shoulder 1.8 form an edge surface 1.21 of the window 1 wherein the edge surface 1.21 shows an exposed edge groove 1.31 with asymmetrical side slopes being oblique to the inside and outside surfaces 40.1, 40.2 of window 1. The slope angels of the edge groove 1.31 correspond to the slope angles α of the block groove 1.3.

The bullet and blast resistant device 11 or frame of the vehicle body 11.1 has a shape or profile corresponding to the edge surface 1.21 of window 1 wherein the ballistic insert 9 is arranged in the block groove 1.3 of the ballistic block 1.1, and, therefore, the device 11 engages with the edge groove 1.31 if the window 1 is installed in the vehicle body 1. More detailed, the device 11 adjoins and covers the insert 9, the outer slope 1.4, and the outer shoulder 1.2 which means that the device 11 covers the edge surface 1.21 of window 1 with insert 9 installed between the inner slope 1.5 of the V-shaped groove 1.3 and the device 11. The device 11 or frame extends on the peripheral edge face of the window 1 along its circumference or at least a part of its circumference, and it has an oblique inner portion 11.2 covering the insert 9 and being flush to the inside surface of the window 1 which is the inside surface of the PC pane 8, an oblique middle portion 11.3 adjoining the oblique inner portion 11.2 and covering the exposed part of the outer slope 1.4, and a flat outer portion 11.4 adjoining the oblique middle portion 11.3 and covering the outer shoulder 1.7 of the ballistic block 1.1. The oblique middle portion 11.3 and the oblique inner portion 11.2 show a V-shape in cross section fitting into the V-shape provided by the edge surface 1.21 of window 1.

Figure 2:
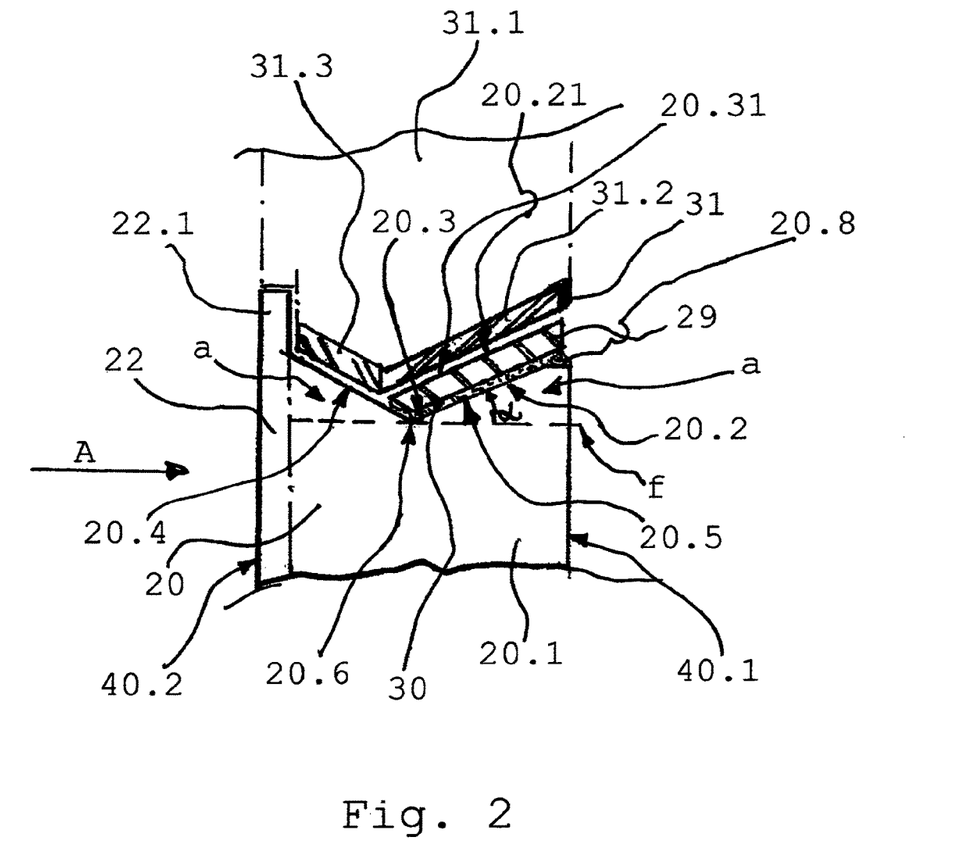
FIG. 2 is a schematic and partial cross-sectional view of a peripheral edge of a bullet and blast resistant window according to a second preferred embodiment of the invention with an associated second apparatus of the invention.

FIG. 2 shows a partial view in cross-section of a preferred embodiment of a bullet and blast resistant apparatus according to a second embodiment of the invention which comprises a bullet and blast resistant window 20 according to a preferred embodiment of the invention as a composite security glazing together with a bullet and blast resistant armoring device 31 that is a part of a vehicle body 31.1 of, for instance, an automotive vehicle. The following is a detailed explanation of the embodiment of the invention shown in FIG. 2 with exemplary reference to the usage of the bullet-proof window 20 or glazing according to the present invention as a windscreen of a automotive vehicle.

The transparent bullet- and blast-resistant window 20 of FIG. 2 has a transparent ballistic block 20.1, at least one outer transparent glass pane 22 with a protrusion 22.1 arranged on the outside of the vehicle, i.e. on the side of impact of for instance a bullet or the pressure wave of an explosion or blast, and a bullet resistant insert 29. The outside and thus the impact side of the vehicle, is again indicated by arrow A in FIG. 2, which faces toward the outer glass pane 22.

The ballistic block 20.1 comprises, for instance, a structure like the ballistic block 1.1 of the embodiment of FIG. 1, or, more generally, a laminate or composite having a peripheral face and a plurality of panes of glass, ceramic or plastic material bonded to each other over their surfaces in a layered composite, and interposed bonding interlayers of plastic material, e.g. of polyurethane (PU) or polyvinyl butyral (PVB) foil. The outer glass pane 22 has a protrusion 22.1 at the peripheral edge of the window 20 which protrudes over the peripheral face 20.2 of the ballistic block 20.1 at the peripheral edge of the window 20.

The peripheral face 20.2 of the ballistic block 20.1 provides a block groove 20.3 in the shape of a symmetrical V with an inclined outer slope 20.4 or side directed obliquely to an outside surface of the window 20 and an inclined inner slope 20.5 or side directed obliquely to an inside surface 40.1 of the window 20 wherein the outer and inner slopes 20.4 and 20.5 cross in a vertex 20.6 or vertex line forming a bottom of the groove 20.3. Further, the peripheral face 20.2 of the ballistic block 20.1 shows a small flat shoulder 20.8 between the inner slope 20.5 of the block groove 20.3 and the inside of window 20. The flat shoulder 20.8 is in an edge plane being normal to the inside and outside surfaces 40.1, 40.2 of window 20 wherein the vertex 20.6 or bottom of the block groove 20.3 extends beneath this edge plane. A slope angle α or inclination of the outer slope 20.4 with respect to a further plane f being normal to the inside and outside surfaces 40.1 and 40.2 is equal to a corresponding slope angle α of the inner slope 20.5 with respect to the plane f. As shown in FIG. 2, the slope angles can be 30° each. The block groove 20.3 is formed along the whole or a part of peripheral circumference or edge of window 20 and occupies substantially the whole peripheral face 20.2.

The ballistic insert 29 is shaped as a flat stripe or frame along at least a part of the peripheral edge of window 20 and it is arranged substantially on the inner slope 20.5 by means of an adhesive or a plastic material like, for instance, a PU foil 30. Accordingly, the ballistic insert 29 is arranged obliquely to the inside and outside of window 20. The ballistic insert 29 could be made of ballistic steel. A side face of the ballistic insert 29 adjoins the outer slope 20.4 by means of a portion of adhesive or PU foil there between, and a further side face of the ballistic insert 29 is substantially flush to the inside surface 40.1 of window 20. Further, the ballistic insert 29 covers the whole inner slope 20.5, the flat shoulder 20.8 of the peripheral face of the ballistic block 20.1, the vertex 20.6, and the portion of the outer slope 20.4 adjoining the vertex 20.6 or bottom of the block groove 20.3.

The exposed surfaces of the ballistic insert 29, the exposed part of the outer slope 20.4, and the flat shoulder 20.8 form an edge surface 20.21 of window 20 wherein the edge surface 20.21 shows an exposed edge groove 20.31 with asymmetrical side slopes being oblique to the inside and outside surfaces 40.1, 40.2 of window 1. The slope angels of the edge groove 20.31 each correspond to the slope angles α of the block groove 20.3.

The bullet- and blast-resistant device 31 of the vehicle body 31.1 shows a shape or profile corresponding to the exposed edge surface 20.21 of window 20 with ballistic insert 29 installed or inserted in the groove 20.3 and, therefore, the device 31 engages positively into the edge groove 20.31 if window 20 is installed in the vehicle body 31.1. More detailed, the device 31 or frame adjoins and covers the insert 29, the outer slope 20.4, and the outer shoulder 20.2 which means that the device 11 covers the whole exposed edge surface 20.21 of the ballistic block 20.1 with insert 29 installed between the inner slope 20.5 of the V-shaped groove 20.3 and the device 31. The device 31 extends on the peripheral edge face of window 20 along at least a part of its circumference, and it has an oblique inner portion 31.2 covering the insert 29 and being flush to the inside surface 40.1 of window 20, and an oblique outer portion 31.3 adjoining the oblique inner portion 31.2 and covering completely the exposed part of the outer slope 20.4. The oblique outer portion 31.3 and the oblique inner portion 31.2 together show a positive V-shape or asymmetric protrusion in cross section which fits positively into the negative V-shape or edge groove 20.31 provided by the exposed peripheral surface 20.21 of window 20. Accordingly, the device 31 of the vehicle body 31.1 covers the whole exposed peripheral surface 20.21 of the ballistic block 20.1 in a form positive manner.

Figure 3:
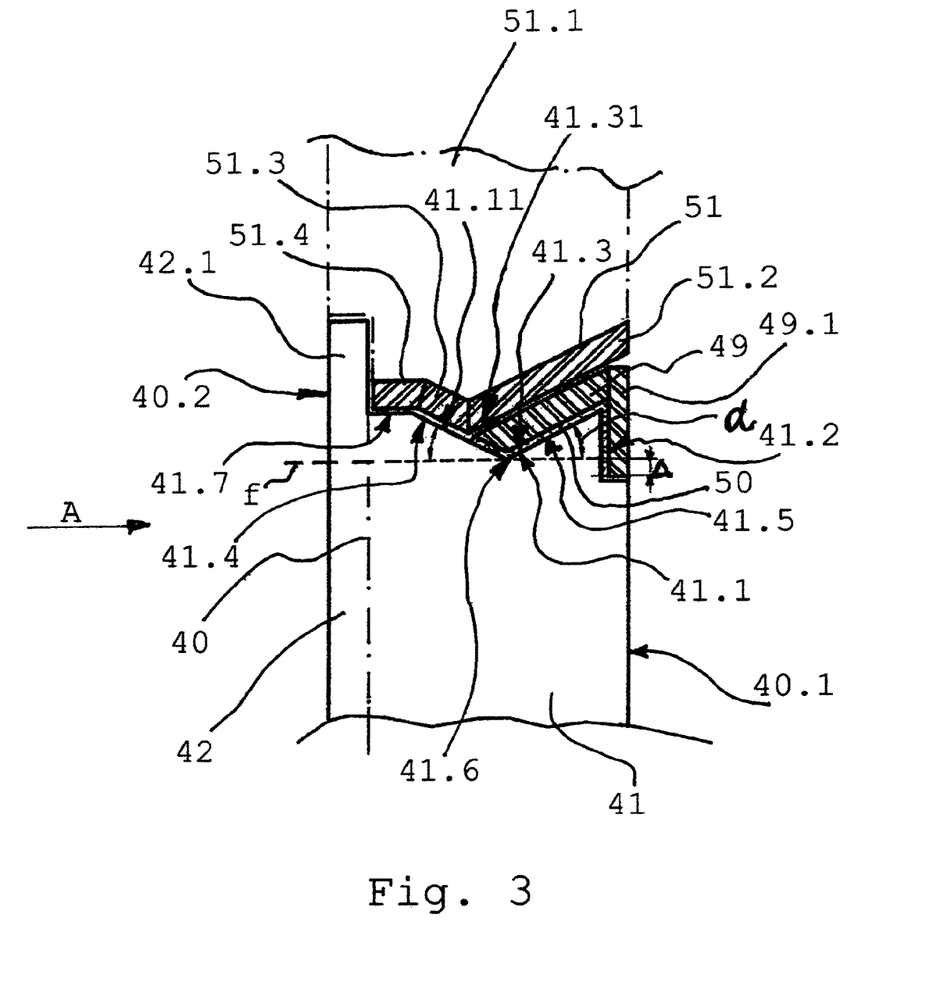
FIG. 3 is a schematic and partial cross-sectional view of a peripheral edge of a bullet- and blast-resistant window according to a third preferred embodiment of the invention with an associated third apparatus of the invention.

FIG. 3 shows a partial view in cross-section of an peripheral edge region of a bullet- and blast-resistant apparatus according to a third preferred embodiment of the invention which comprises a bullet- and blast-resistant window 40 according to a preferred embodiment of the invention as a composite security glazing together with a bullet- and blast resistant armoring device 51 that is a part of a vehicle body 51.1 or chassis of, for instance, an automotive vehicle. The following is a detailed explanation of the embodiment of the invention shown in FIG. 3 with exemplary reference to the usage of the bullet-proof window 40 according to the present invention as a windscreen of the automotive vehicle.

The transparent bullet- and blast-resistant window 40 of FIG. 3 shows a transparent ballistic block 41 and at least one outer transparent glass pane 42 arranged on the outside of the vehicle, i.e. on the side of impact of, for instance, a bullet or the pressure wave of an explosion, and a bullet-resistant insert 49. The outside and thus the impact side of the vehicle, is indicated by arrow A in FIG. 3, which faces toward the outer glass pane 42.

The ballistic block 41 comprises, for instance, a structure like the ballistic block 1.1 of the embodiment shown in FIG. 1, or, more generally, a laminate or composite having a peripheral face and a plurality of panes of glass, ceramic or plastic material bonded to each other over their surfaces in a layered composite, and interposed bonding interlayers of plastic material, e.g. of polyurethane (PU) or polyvinyl butyral (PVB) foil. The outer glass pane 42 has a protrusion 42.1 on the peripheral edge of window 40 which protrudes over the peripheral face 41.1 of the ballistic block 41 at the peripheral edge of window 40. A thickness of the protrusion may be 10 mm.

The peripheral face 41.1 of the ballistic block 41 provides a block groove 41.3 substantially in the shape of a V with an inclined outer slope 41.4 or side directed obliquely to an outside surface 40.2 of the window 40 and an inclined inner slope 41.5 or side directed obliquely to an inside surface 40.1 of the window 40 wherein the outer and inner slopes 41.4 and 41.5 cross in a vertex 41.6 or vertex line forming a bottom of the block groove 41.3. Further, the peripheral face 41.1 of the ballistic block 41 shows a flat shoulder 41.7 between the outer glass pane 42 and the inclined outer slope 41.4 of the block groove 41.3. The ballistic block 41 has a circumferential recess 41.2 or step adjoining the inner slope 41.5. The recess 41.2 is open to an inside of the vehicle. The flat shoulder 41.7 is in a plane being normal to the inside and outside surfaces 40.1, 40.2 of window 40 wherein the vertex 41.6 or bottom of the groove 41.3 extends beneath this plane. A slope angle α or inclination of the outer slope 41.4 with respect to a further plane f being normal to the inside and outside surfaces 40.1, 40.2 of window 40 is equal to a corresponding slope angle α of the inner slope 41.5 with respect to the plane f. The deepness of the block groove 41.3 may be 10 mm that corresponds to the distance between the horizontal shoulder 41.7 and the further plane. f. As shown in FIG. 3, the slope angles α can be, for instance, 30° or 27° each. The block groove 41.3 is formed along the whole or a part of peripheral circumference or edge of window 40. A thickness of the window 40 may be ca. 61.65 mm.

The ballistic insert 49 of the ballistic block 41 is shaped as a flat stripe or frame along the peripheral edge of window 40 and it is arranged substantially on the inner slope 41.5 by means of an adhesive or a plastic material like, for instance, a PU foil 50. Accordingly, the ballistic insert 49 is arranged obliquely to the inside and outside surfaces 40.1, 40.2 of window 40. The ballistic insert 49 is made of ballistic steel. The thickness of the ballistic insert 49 may be ca. 5 mm. A side face of the ballistic insert 49 adjoins the outer slope 41.4 by means of an adhesive layer 50 made, for instance, of thermoplastic PU foil. Further, the ballistic insert 49 covers the whole inner slope 41.5 of the peripheral face of the ballistic block 41, the vertex 41.6, and a part of the outer slope 41.4 adjoining the vertex 41.6 or bottom of the block groove 41.3.

The exposed surfaces of the ballistic insert 49, the exposed part of the outer slope 41.4, and the flat shoulder 41.7 form an edge surface 41.11 of the window 1 wherein the edge surface 41.11 shows an exposed edge groove 41.31 with asymmetrical side slopes being oblique to the inside and outside surfaces 40.1, 40.2 of window 40. The slope angels of the edge groove 41.31 correspond to the slope angles α of the block groove 41.3.

The window 40 comprises a further vertical insert 49.1 that is inserted and arranged in the laterally open recess 41.2 of the ballistic block 41 and that is flush to the inside surface 40.1 of window 40. The vertical insert 49.1 has a rectangular cross section and could be connected to the oblique ballistic insert 49 or can be integral therewith. Further, the vertical insert 49.1 is fixed on the ballistic block 41 by means of an additional adhesive layer like, for instance, a PU foil. The insert 49.1 can be made of ballistic steel. A thickness of the vertical insert 49.1 may be ca. 3 mm. The insert 49.1 protrudes from the recess 41.2 to adjoin the ballistic insert 49 laterally and the device 51. Further, the vertical insert 49.1 can overlap laterally the whole block groove 41.3 of the ballistic block 41 and also the edge groove 41.31 of window 40 which means that the insert 49.1 extends over the plane f containing the vertex 41.6 by a positive overlapping distance Δ that may be ca. 3 mm.

The bullet- and blast-resistant device 51 of the vehicle body 51.1 has a shape corresponding substantially to the exposed edge surface 41.11 of window 40 or pane that comprises the outer shoulder 41.7, the outer slope 41.4, an exposed surface of the oblique ballistic insert 49, and a face of the vertical insert 49.1 or part, and, therefore, the device 51 engages into the edge groove 41.31 if the window 40 is installed in the vehicle body 51.1. The outer horizontal shoulder 41.7 can measures ca. 9 mm. More detailed the device 51 or frame adjoins and covers the vertical insert 49.1, the oblique ballistic insert 49, the oblique outer slope 41.4, and the flat outer shoulder 41.7 which means that the device 51 covers the whole exposed edge surface 41.11 of window 40. The double-bent device 51 may be, for instance, 5 mm thick.

The device 51 extends on the peripheral surface 41.11 of window 40 along its circumference or at least a part of its circumference. The device 51 of the vehicle body 51.1 comprises an oblique inner portion 51.2 covering the vertical and oblique ballistic inserts 49 and 49.1 and being flush to the inside surface 40.1 of window 40, an oblique middle portion 51.3 adjoining the oblique inner portion 51.2 and covering the exposed part of the outer slope 41.4, and a flat outer portion 51.4 adjoining the oblique middle portion 41.3 and covering the outer shoulder 41.7 of the ballistic block 41. The oblique middle portion 51.3 and the oblique inner portion 51.2 show a V-shape in cross section fitting into the V-shape provided by the exposed peripheral surface 41.11 of window 40.

Figure 4:
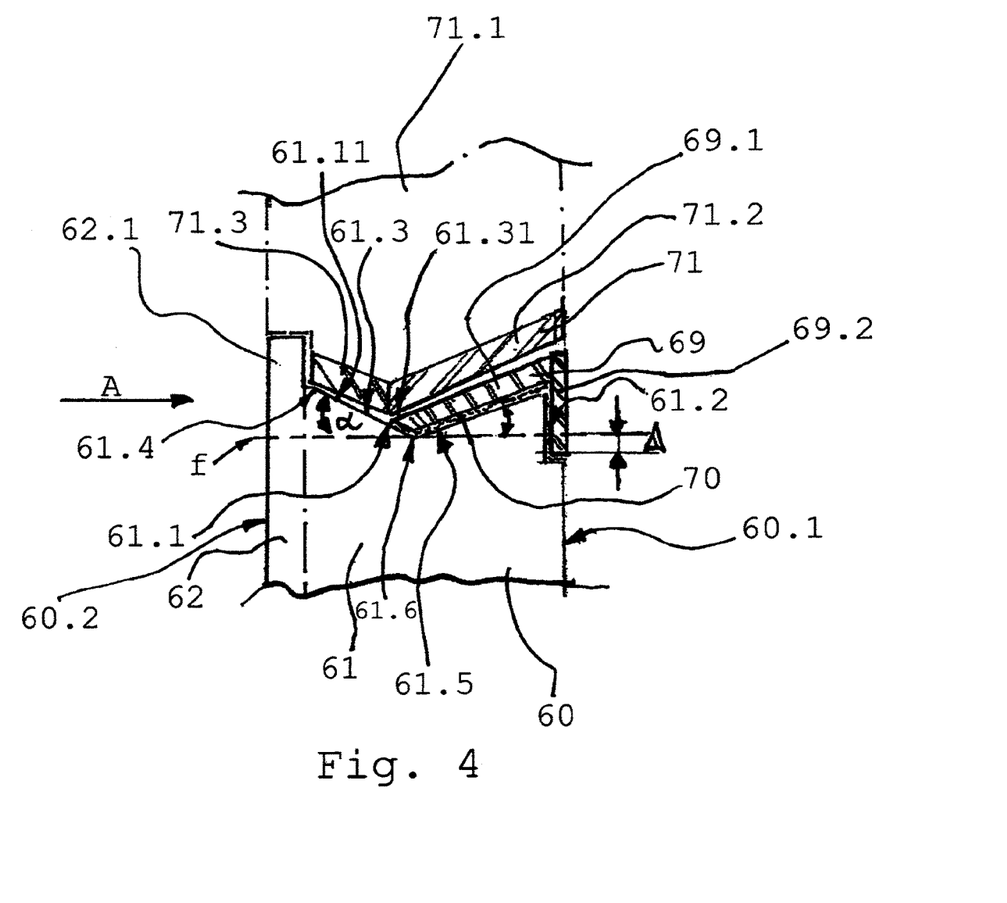
FIG. 4 is a schematic and partial cross-sectional view of a peripheral edge of a bullet- and blast-resistant window according to a fourth preferred embodiment of the invention with an associated apparatus of the invention.

FIG. 4 shows a partial view in cross-section of a bullet- and blast-resistant apparatus according to a fourth preferred embodiment of the invention which comprises a bullet- and blast-resistant window 60 according to a preferred embodiment of the invention as a composite security glazing together with a bullet- and blast-resistant armoring device 71 or frame that is a part of a vehicle body 71.1 or chassis of, for instance, an automotive vehicle.

The transparent bullet and blast resistant window 60 of FIG. 4 shows a transparent ballistic block 61 and at least one outer transparent glass pane 62 arranged on the outside of the vehicle, i.e. on the side of impact of, for instance, a bullet or a pressure wave of an explosion, and a bullet resistant insert 69. The outside and thus the impact side of the vehicle, is indicated by arrow A in FIG. 4, which faces toward the outer glass pane 62.

The ballistic block 61 comprises, for instance, a structure like the ballistic block 1.1 of the embodiment shown in FIG. 1, or, more generally, a laminate or composite having a peripheral face and a plurality of bullet resistant panes of glass, ceramic or plastic material, for instance, polycarbonate (PC), bonded to each other over their surfaces in a layered composite, and interposed bonding interlayers of plastic material, e.g. of polyurethane (PU) or polyvinyl butyral (PVB) foil. The outer glass pane 62 has a protrusion 62.1 on the peripheral edge of window 60 which protrudes over the peripheral face 61.1 of the ballistic block 61 at the peripheral edge of window 60.

The peripheral face 61.1 of the ballistic block 61 provides a block groove 61.3 substantially in the shape of a V with an inclined outer slope 61.4 or side directed obliquely to an outside surface 60.2 of the window 60 and an inclined inner slope 61.5 or side directed obliquely to an inside surface 60.1 of the window 60 wherein the outer and inner slopes 61.4 and 61.5 cross in a vertex 61.6 or vertex line forming a bottom of the groove 61.3. Further, the ballistic block 61 has a circumferential recess 61.2 or step adjoining the inner slope 61.5, wherein the recess 61.2 is open to an inside of the vehicle. A slope angle α or inclination of the outer slope 61.4 with respect to a plane f being normal to inside and outside surfaces 60.1, 60.2 of window 60 wherein the vertex 61.6 or bottom of the block groove 61.3 extends in this plane f, is equal to a corresponding slope angle α of the inner slope 61.5 with respect to the plane f. As shown in FIG. 4, the slope angles α each can be 30°. The block groove 61.3 is formed along the whole or a part of peripheral circumference or edge of window 60.

The ballistic insert 69 for stopping bullets can be made of ballistic steel and it comprises an oblique insert 69.1 and a vertical insert 69.2. The oblique insert 69.1 of window 60 is shaped as a flat stripe or frame along the peripheral edge of window 60 and it is arranged substantially on the inner slope 61.5 by means of an adhesive or a plastic material like, for instance, a PU foil 70. Accordingly, the oblique ballistic insert 69.1 is arranged obliquely to the inside 60.1 and outside 60.2 of window 60. A side face of the insert 69.1 adjoin the outer slope 61.4 by means of an adhesive layer 70 made, for instance, of thermoplastic PU foil. Further, the ballistic insert 69.1 covers the whole inner slope 61.5 of the peripheral face of the ballistic block 61, the vertex 61.6, and a part of the outer slope 61.4 adjoining the vertex 61.6 or bottom of the block groove 61.3.

The exposed surfaces of the ballistic insert 69.1 or the integral insert 69 and the exposed part of the outer slope 61.4 form an exposed edge surface 61.11 of the window 60 wherein the edge surface 61.11 shows an exposed edge groove 61.31 with asymmetrical side slopes being oblique to the inside and outside surfaces 60.1, 60.2 of window 60. The slope angels of the edge groove 61.31 correspond to the slope angles α of the block groove 61.3.

The vertical insert 69.2 is inserted and arranged in the laterally open recess 61.2 of the ballistic block 61 and it is flush to the inside 60.1 of window 60. The vertical insert 69.2 has a rectangular cross section and could be connected to the oblique ballistic insert 69.1 or can be integral therewith. Further, the vertical insert 69.2 is fixed on the ballistic block 61 by means of an additional adhesive layer like, for instance, a PU foil. The insert 69.2 protrudes from the recess 61.2 to adjoin laterally the ballistic insert 69.1 and the device 71. Further, the vertical insert 69.2 can overlap the whole block groove 61.3 and edge groove 61.31 laterally which means that the vertical insert 69.2 extends laterally over the plane f containing the vertex 61.6 by a positive overlapping distance Δ to stop a bullet from entering the interior of the vehicle.

The bullet- and blast-resistant device 71 of the vehicle body 71.1 has a shape or profile corresponding substantially to the exposed edge surface 61.11 of window 60 that comprises the outer slope 61.4, an exposed surface of the oblique ballistic insert 69.1, and a face of the vertical insert 69.2, and, therefore, the device 71 engages into the edge groove 61.31 if the window 60 is installed in the vehicle body 71.1. More detailed, the device 71 adjoins and covers the vertical insert 69.2, the oblique ballistic insert 69.1, and the oblique outer slope 61.4, which means that the device 71 covers the whole exposed edge surface 61.11 of window 60.

The device 71 extends on the peripheral edge face of the window 60 along its circumference or at least a part of its circumference. The device 71 of the vehicle body 71.1 comprises an oblique inner portion 71.2 covering the vertical and oblique ballistic inserts 69.2 and 69.1 and being flush to the inside surface 60.1 of window 60, and an oblique outer portion 71.3 adjoining the oblique inner portion 71.2 and covering the exposed area of the outer slope 61.4 of the ballistic block 61. The oblique outer portion 71.3 and the oblique inner portion 71.2 show a V-shape in cross section fitting into the V-shape provided by the exposed peripheral surface 61.11 of window 60 to fix and keep the window 60 in the window frame in the case of a blast or explosion.

Figure 5:
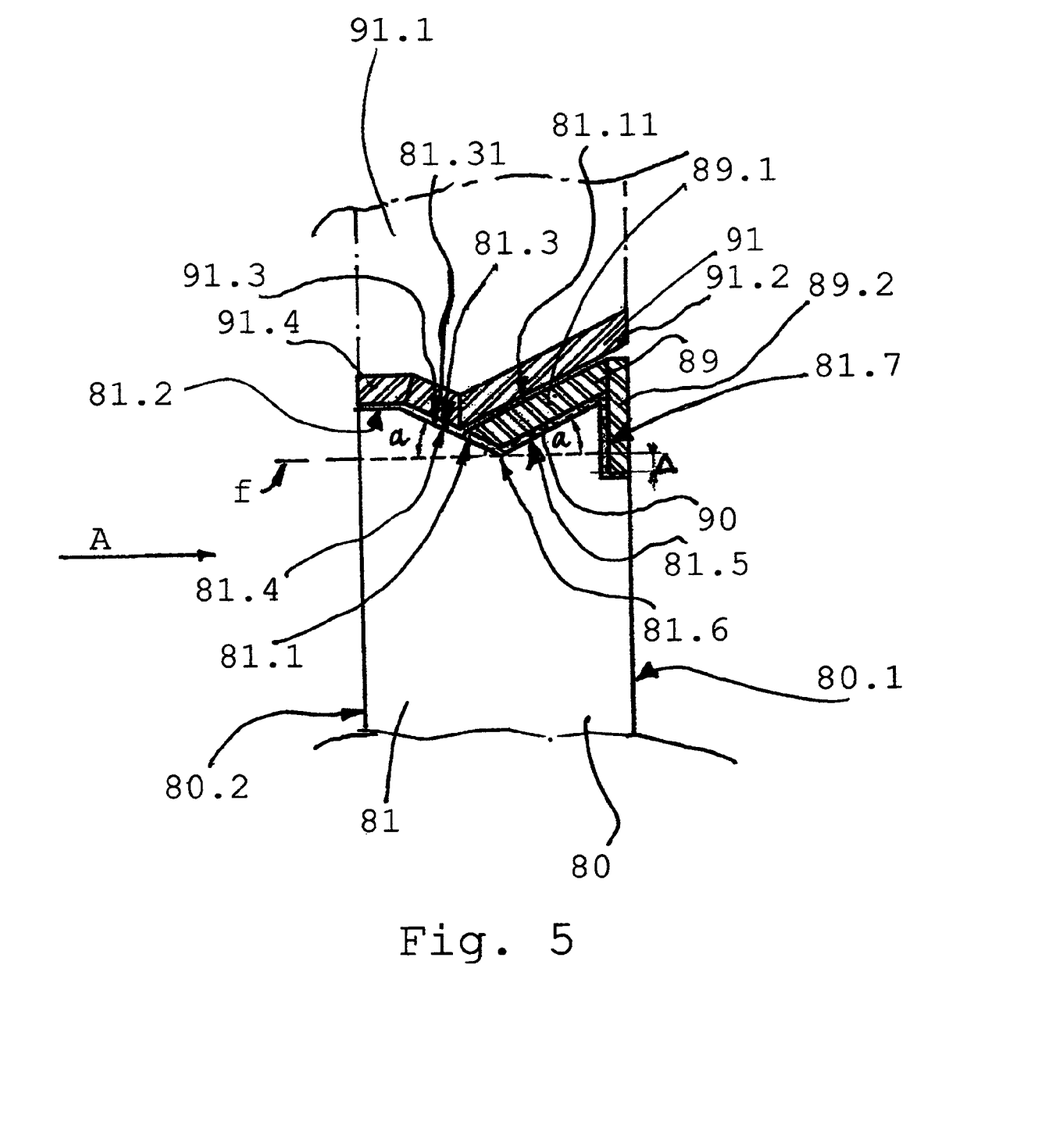
FIG. 5 is a schematic and partial cross-sectional view of a peripheral edge of a bullet- and blast-resistant window according to a fifth embodiment of the invention with an associated apparatus of the invention.

FIG. 5 shows a partial view in cross-section of a bullet- and blast-resistant apparatus according to a fifth preferred embodiment of the invention which comprises a bullet- and blast-resistant window 80 according to a preferred embodiment of the invention as a composite security glazing together with a bullet- and blast-resistant armoring device 91 or frame that is a part of a vehicle body 91.1 or chassis of, for instance, an automotive vehicle.

The transparent bullet- and blast-resistant window 80 of FIG. 5 shows a transparent ballistic block 81, but without any outer glass pane shown in FIG. 4, and a bullet-resistant insert 89. The outside and thus the impact side of the vehicle, is indicated by an arrow A in FIG. 5, which faces toward an outside of the window 80 or ballistic block 81.

Again the ballistic block 81 comprises, for instance, a structure similar to the ballistic block 1.1 of the embodiment shown in FIG. 1, or, more generally, a laminate or composite having a peripheral face and a plurality of bullet resistant panes of glass, ceramic or plastic material, for instance, polycarbonate PC, bonded to each other over their surfaces in a layered composite, and interposed bonding interlayers of plastic material, e.g. of polyurethane (PU) or polyvinyl butyral (PVB) foil. The ballistic block 81 has a peripheral face 81.1 at the peripheral edge of window 80.

The peripheral face 81.1 of the ballistic block 81 provides a block groove 81.3 substantially in the shape of a V with an inclined outer slope 81.4 or side directed obliquely to an outside surface 80.2 of the window 80 and an inclined inner slope 81.5 or side directed obliquely to an inside surface 80.1 of window 80 wherein the outer and inner slopes 81.4 and 81.5 cross in a vertex 81.6 or vertex line forming a bottom of the block groove 81.3. There is a flat shoulder 81.2 between the outside surface 80.2 of window 80 or ballistic block 81 and the outer oblique slope 81.4. Further, the ballistic block 81 has a circumferential recess 81.6 or step adjoining the inner slope 81.5, wherein the recess 81.7 is open to an inside compartment of the vehicle. A slope angle $\alpha$ or inclination of the oblique outer slope 81.4 with respect to a plane f being normal to the inside and outside surfaces 80.1, 80.2 of window 80 wherein the vertex 81.6 or bottom of the block groove 81.3 extending in this plane f is equal to a corresponding slope angle $\alpha$ of the inner slope 81.5 with respect to the plane f. As shown in FIG. 4, the slope angles $\alpha$ each can be 30°. The block groove 81.3 is formed along the whole or a part of peripheral circumference or edge of window 80.

The exposed surfaces of the ballistic insert 89.1, the exposed part of the outer slope 81.4, and the flat shoulder 81.2 form an exposed edge surface 81.11 of the window 80 wherein the edge surface 81.11 shows an exposed edge groove 81.31 with asymmetrical side slopes being oblique to the inside and outside surfaces 80.1, 80.2 of window 80. The slope angels of the edge groove 81.31 correspond to the slope angles $\alpha$ of the block groove 81.3.

The ballistic insert 89 can be made of ballistic steel and it comprises an oblique insert 89.1 and a vertical insert 89.2. The oblique insert 89.1 of window 80 is shaped as a flat stripe or frame along the peripheral edge of window 80 and it is arranged substantially on the inner slope 81.5 by means of an adhesive or a plastic material like, for instance, a PU foil 90. Accordingly, the oblique ballistic insert 89.1 is formed obliquely to the inside and outside surfaces 80.1 and 80.2 of window 80. A side face of the insert 89.1 adjoins the outer slope 81.4 by means of the adhesive layer 90 made, for instance, of thermoplastic PU foil. Further, the ballistic insert 89.1 covers the whole inner slope 81.5 of the peripheral face of the ballistic block 81, the vertex 81.6, and a part of the outer slope 81.4 adjoining the vertex 81.6 or bottom of the groove 81.3.

The vertical insert 89.2 is inserted and arranged in the laterally open recess 81.7 of the ballistic block 81 and it is flush to the inside 80.1 of window 80. The vertical insert 89.2 has a rectangular cross section like a stripe and it could be connected to the oblique ballistic insert 89.1 or can be integral therewith. Further, the vertical insert 89.2 is fixed on the ballistic block 81 by means of an additional adhesive layer like, for instance, a PU foil. The insert 89.2 protrudes from the recess 81.7 to adjoin laterally the ballistic insert 89.1 and the device 91. Further, the vertical insert 89.2 can overlap the whole block groove 81.3 and the whole edge groove 81.31 laterally which means that the vertical insert 89.2 extends laterally over the plane f containing the vertex 81.6 by a positive overlapping distance $\Delta$.

The bullet and blast resistant device 91 of the vehicle body 91.1 has a shape or profile corresponding substantially to the exposed edge surface 81.11 of window 80 that comprises the flat shoulder 81.2, the outer slope 81.4, an exposed surface of the oblique ballistic insert 89.1, and a face of the vertical insert 89.2, and, therefore, the device 91 engages into the edge groove 81.31 if the window 80 is installed in the vehicle body 91.1. More detailed the device 91 or frame adjoins and covers the vertical insert 89.2, the oblique ballistic insert 89.1, the oblique outer slope 81.4, and the flat shoulder 81.2 which means that the device 91 covers the whole exposed edge surface 81.11 of window 80.

The device 91 extends on the peripheral edge of the window 80 along its circumference or at least a part of its circumference. The device 91 of the vehicle body 91.1 comprises an oblique inner portion 91.2 covering the vertical and oblique ballistic inserts 89.2 and 89.1 and being flush to the inside surface 80.1 of window 80, an oblique outer portion 91.3 adjoining the oblique inner portion 91.2 and covering the exposed area of the outer slope 81.4 of the ballistic block 81, and a flat outer portion 91.4 adjoining the oblique outer portion 91.3 and covering the flat shoulder 81.2 of the ballistic block 81. The flat outer portion 91.4 is flush laterally to the outside surface 80.2 of the window 80. The oblique outer portion 91.3 and the oblique inner portion 91.2 show substantially a V-shape in cross section fitting into the V-shape provided by the exposed peripheral surface of window 80.

The invention claimed is:

1. Bullet- and blast-resistant window, in particular for use in a motor vehicle, comprising a ballistic block having a peripheral face and a plurality of panes of glass, ceramic or plastic material bonded to each other over their surfaces in a layered composite, and interposed bonding interlayers of plastic material or adhesive, characterized by an edge groove having slopes at least partly inclined for engagement with a part of the vehicle body and extending on and along at least a part of the peripheral edge of the window,
  wherein the ballistic block comprises a v-shaped block groove with oblique side walls and the window comprises a layer or insert made of bullet resistant material and bonded on at least one of the oblique side walls of the block groove,
  wherein the oblique side walls of the ballistic block comprise an outer side wall and an inner side wall directed obliquely to an outside surface and an inside surface of the window of the vehicle, and the bullet resistant insert covers at least a part of the inner side wall of the V-shaped block groove.

2. Bullet- and blast-resistant window according to claim 1, wherein the V-shaped edge groove has slopes with same or different inclination.

3. Bullet- and blast-resistant window according to claim 1, further comprising an additional outer pane made of glass, ceramic or plastic material and bonded to an outside of the ballistic block by an interposing layer made of plastic material, the additional outer glass pane projecting over the peripheral face of the ballistic block on the peripheral edge of the bullet-resistant window.

4. Bullet- and blast-resistant window according to claim 1, wherein the bullet-resistant insert is a strip made of ballistic steel.

5. Bullet- and blast-resistant window according to claim 1, further comprising:
  an inside surface recess provided on the inside surface of the window, wherein the inside surface recess adjoins the block groove on the peripheral face of the ballistic block; and
  a bullet resistant part extending from the peripheral face of the ballistic block in the inside surface recess.

6. Bullet- and blast-resistant window according to claim 5, wherein the inside surface of the window and the bullet resistant part are flush.

7. Bullet- and blast-resistant window according to claim 5, wherein the bullet resistant part covers and/or overlaps the edge groove and the block groove of the ballistic block laterally.

8. Bullet- and blast-resistant window according to claim 5, wherein the bullet-resistant insert and the bullet resistant part are connected to each other or are integral.

9. Bullet- and blast-resistant window according to claim 5, wherein the bullet-resistant insert and/or the bullet resistant part is fixed on the ballistic block by an adhesive or polyurethane (PU) or polyvinylbutyral (PVB).

10. Bullet- and blast-resistant apparatus for an automotive vehicle, comprising:
  a bullet- and blast-resistant window according to claim 1; and
  a bullet-resistant armoring device provided to be engaged in an edge groove having side walls at least partly inclined, and being part of the vehicle body.

11. Bullet- and blast-resistant apparatus according to claim 10, wherein the armoring device covers an edge surface of the bullet- and blast-resistant window.

12. Bullet- and blast-resistant apparatus according to claim 10, wherein the bullet-resistant armoring device fits positively into the edge groove of the window.

13. A bullet- and blast-resistant window for a motor vehicle, comprising:
  a ballistic block having a peripheral face and comprising:
    a plurality of panes of glass, ceramic or plastic material; and
    interposed bonding interlayers of plastic material or adhesive, wherein the plurality of panes are bonded to each other in a layered composite by the interposed bonding interlayers; and
  an edge groove having slopes inclined for engagement with a part of a vehicle body of the motor vehicle, the edge groove extending on and along at least a part of a peripheral edge of the window,
  wherein
  the ballistic block comprises a V-shaped block groove with oblique side walls,
  the window further comprises a bullet resistant insert of bullet resistant material and bonded on at least one of the oblique side walls of the V-shaped block groove,
  the oblique side walls of the V-shaped block groove comprise
    an outer side wall directed obliquely to an outside surface of the window, and
    an inner side wall directed obliquely to an inside surface of the window, and
  the bullet resistant insert is bonded on and covers at least a part of the inner side wall of the V-shaped block groove.

14. The bullet- and blast-resistant window according to claim 13, wherein the bullet resistant insert is a strip of ballistic steel.

15. The bullet- and blast-resistant window according to claim 13, further comprising:
  an inside surface recess on the inside surface of the window, wherein the inside surface recess adjoins the inner side wall of the V-shaped block groove; and
  a bullet resistant part in the inside surface recess.

16. The bullet- and blast-resistant window according to claim 15, wherein the inside surface of the window and the bullet resistant part are flush.

17. The bullet- and blast-resistant window according to claim 15, wherein, in a thickness direction of the window, the bullet resistant part overlaps the edge groove and the block groove.

18. The bullet- and blast-resistant window according to claim 15, wherein the bullet resistant insert and the bullet resistant part are connected or integral to each other.

19. The bullet- and blast-resistant window according to claim 15, wherein at least one of the bullet resistant insert or the bullet resistant part is fixed on the ballistic block by an adhesive or polyurethane (PU) or polyvinylbutyral (PVB).

20. The bullet- and blast-resistant window according to claim 13, wherein the edge groove is a V-shaped edge groove which has slopes with the same inclination.

* * * * *